United States Patent [19]
Bozoian

[11] 3,886,518
[45] May 27, 1975

[54] CRITICAL LIQUID-LEVEL WARNING CIRCUIT

[75] Inventor: Michael Bozoian, Ann Arbor, Mich.

[73] Assignee: Ford Motor Company, Dearborn, Mich.

[22] Filed: Jan. 4, 1974

[21] Appl. No.: 430,955

[52] U.S. Cl. ............................ 340/59; 340/244 R
[51] Int. Cl. .......................................... G08b 21/00
[58] Field of Search ................ 340/244, 59; 73/308

[56] References Cited
UNITED STATES PATENTS

| | | | |
|---|---|---|---|
| 2,867,698 | 1/1959 | Gondolfo | 340/266 X |
| 3,534,352 | 10/1970 | Gallagher | 340/244.6 |
| 3,755,801 | 8/1973 | Mild | 340/244 R |
| 3,792,456 | 2/1974 | Hill | 340/244 R |

Primary Examiner—John W. Caldwell
Assistant Examiner—Daniel Myer
Attorney, Agent, or Firm—Robert W. Brown; Keith L. Zerschling

[57] ABSTRACT

A critical liquid-level warning circuit for association with a liquid-level indicating circuit, the indicating circuit including a sensing device that provides a voltage which varies between upper and lower voltage limits as a function of the level of a liquid. The warning circuit comprises circuitry for developing a characteristic signal when the sensing device voltage goes above or below a predetermined critical level, circuitry responsive to the characteristic electrical signal for actuating a warning device when the predetermined critical level is reached, and circuitry for establishing the operability of the warning device when electrical power initially is supplied to the warning circuit. Preferably, the warning circuit is used to indicate when the amount of fuel in the fuel tank of a motor vehicle has fallen to a predetermined critical level, and preferably circuitry is provided for preventing false low-fuel warnings.

5 Claims, 1 Drawing Figure

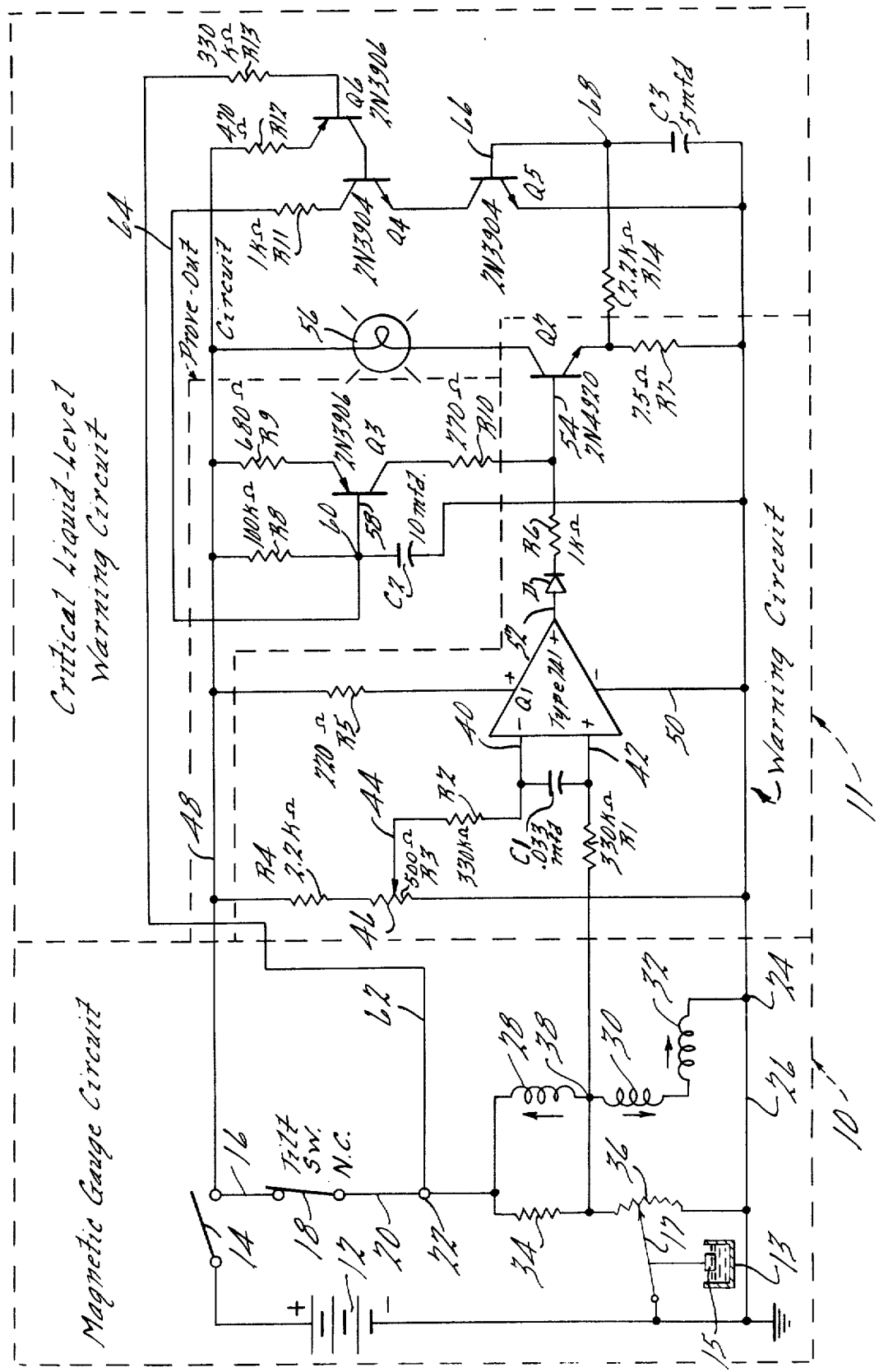

3,886,518

CRITICAL LIQUID-LEVEL WARNING CIRCUIT

BACKGROUND OF THE INVENTION

This invention relates to motor vehicle instrumentation for producing a warning signal when the level of a liquid in a motor vehicle has reached a predetermined critical level. More particularly, the invention relates to a warning circuit for association with a liquid-level indicating circuit for a motor vehicle. The warning circuit may be used to indicate that the liquid in the fuel tank of a motor vehicle has fallen below a predetermined critical level.

In most modern motor vehicles, the driver of the vehicle is provided with a gauge indicating the level of the fuel in the vehicle fuel tank. The fuel gauge is connected in an indicating circuit which is coupled through an ignition switch to a DC source of electrical energy and which includes a sensing device which produces a voltage which varies between upper and lower voltage limits as a function of the liquid level in the fuel tank. Typically, the sensing device in the indicating circuit is a rheostat connected in circuit with a fuel gauge. The rheostat varies the current flowing through the fuel gauge to provide a change in gauge indicator position as a function of the liquid level in the fuel tank. Unfortunately, it is quite possible for the fuel gauge to indicate an empty fuel tank without the driver of the vehicle observing the condition. For this reason, it is desirable to provide a warning circuit for association with the indicating circuit to warn the driver of the vehicle when a predetermined critical liquid level in the fuel tank occurs.

Existing liquid-level gauge systems for motor vehicles employ either electromagnetic or bimetal gauges. In either case, a sensing device, usually the rheostat referred to above, is used to control the gauge indication. The movement of the arm of the rheostat is controlled by a float which moves upwardly and downwardly in response to fluctuating fuel levels.

Magnetic gauges used to indicate fuel level in a motor vehicle are very responsive to fluctuations in the signal produced by the liquid-level sensing device. In the absence of isolation of the liquid-level sensing device from rapidly fluctuating, or, transient, liquid-level variations, the signal produced by it may fluctuate considerably during motor vehicle operation causing erratic readings on the magnetic gauge. To prevent this, a switch, responsive to vehicle accelerations and orientations, may be connected in series with the magnetic gauge. The switch opens at times when the liquid level in the fuel tank is varying rapidly, such as occurs when the vehicle is traveling over bumpy roads or going uphill or downhill, and the opening of the switch prevents current flow through the magnetic gauge, but the gauge retains its indication. A suitable switch of this kind and a magnetic gauge circuit in which the switch is used are described in U.S. Patent application Ser. No. 255,608 filed May 22, 1972, in the names of J. F. Burgett, L. J. Vanderberg and G. F. Woodward and entitled "Magnetic Gauge Circuitry with Input Current Interruption," now U.S. Pat. No. 3,784,973.

SUMMARY OF THE INVENTION

The present invention provides a critical liquid-level warning circuit that is compatible with the magnetic gauge circuit described in the patent application mentioned above and which, in fact, in its preferred form, makes use of the switch described therein for interrupting the current to a magnetic gauge to prevent a false critical liquid-level warning signal which might otherwise occur during vehicle maneuvers in which the liquid in the vehicle fuel tank sloshes about. Moreover, the warning circuit of the present invention is compatible with other types of liquid level indicating circuits that employ a sensing device that provides a voltage that varies between upper and lower voltage limits as a function of the liquid level sensed by the sensing device.

The critical liquid-level warning circuit of the invention, for association with a liquid-level indicating circuit, includes first circuit means, supplied with the sensing device voltage, for generating an electrical signal having one of two conditions depending upon whether the sensing-device voltage is above or below a predetermined critical level. An electrically actuable warning device is provided. Second circuit means are provided for actuating the warning device when the first circuit means electrical signal is in one of its conditions and for preventing actuation of the warning device when the first circuit means electrical signal is in the other of its conditions. A third circuit means, coupled to the second circuit means, is provided for actuating the warning device for a predetermined time subsequent to the time at which a DC source of electrical energy is coupled to the liquid-level indicating and warning circuits. This provides a prove-out capability for the warning device.

Where the liquid-level indicating circuit includes a switch for interrupting the current to the sensing device, as described above and in the aforementioned patent application, then the critical liquid-level warning circuit of the invention may include fourth circuit means for causing the warning device to retain the state of warning attained by it immediately prior to the interruption of the current to the sensing device.

The warning circuit of the invention is very sensitive to changes in voltage at the liquid-level sensing device at a predetermined critical level, has inherent warning-device prove-out capability, and is capable of operating a high candlepower warning lamp or other warning device. Moreover, the warning circuit may include circuitry for preventing false critical liquid-level warnings and may operate over a broad voltage range, for example, 10 to 20 volts DC. Also, the circuitry includes transient protection.

The invention may be better understood by reference to the drawing which is a schematic diagram of a fuel indicating and warning circuit for a motor vehicle.

DETAILED DESCRIPTION OF THE INVENTION

With reference now to the drawing, there is shown a magnetic gauge liquid-level indicating circuit 10 for indicating the level of fuel in the fuel tank of a motor vehicle. A critical liquid-level warning circuit 11 is associated with the indicating circuit 10.

The indicating circuit 10 comprises a source of electrical energy 12, such as a 12-volt DC vehicle storage battery, having its negative terminal connected to a ground lead 26 and having its positive terminal connected to an ignition switch 14. An electrical lead 16 connects the ignition switch 14 to a normally closed switch 18 (tilt switch) that is mounted in the vehicle and that is sensitive to vehicle acceleration and deceleration as well as to its orientation relative to the earth's gravitational field. A lead 20 connects the switch 18 to one terminal 22 of a magnetic gauge. The magnetic gauge includes three serially connected coils 28, 30, and 32.

The magnetic gauge coils 28, 30 and 32 are physically positioned relative to one another such that their magnetic fields have the directional orientations indicated by the arrows adjacent the coils. Thus, when current flows through the coils 28, 30 and 32, the magnetic field developed by the coil 28 is opposed or bucked by the magnetic field developed by the coil 30. The magnetic field of the coil 32 is directed at right angles to the magnetic fields developed by the coils 28 and 30. The direction of the vector resultant of these magnetic fields determines the position of indicating means (not shown) associated with the magnetic gauge. Preferably, the magnetic gauge is constructed such that opening of the switch 18 does not cause the indicating means of the magnetic gauge to change its position, that is, the magnetic gauge indicating means retains the reading it has attained immediately prior to the opening of the switch 18.

A resistor 34 is connected in parallel with the magnetic gauge coil 28 and determines the amount of current that flows through the coil 28. The resistor 34 is not essential to operation of the magnetic gauge circuitry, but it is desirable in that it can be used for gauge calibration and limits the current through the coil 28 while simultaneously reducing the voltage drop across it. A typical value for the resistor 34 is 90 ohms.

A variable resistance or rheostat 36 is connected in parallel with the serially connected magnetic gauge coils 30 and 32. The variable resistance 36 is positioned in the fuel tank 13 of a motor vehicle and may be varied by means of a simple unenclosed float mechanism 15 well known in the prior art. The rheostat has a movable arm 17 connected to ground. A typical range of resistance values for the variable resistance 36 is from 0 ohms when the fuel tank is full to 90 ohms when the fuel tank is empty. An intermediate range could also be used, such as 10 ohms when the fuel tank is full to 73 ohms when the fuel tank is empty. From the circuit 10, it is apparent that when the resistance 36 is 0 ohms or a very low resistance value, corresponding to a full fuel tank, little or no current flows through the magnetic gauge coils 30 and 32 and that most of the current flows through the parallel combination of the resistor 34 and the coil 28 and through the variable resistance 36. Under such conditions, the voltage at the point 38 in the circuit 10 is quite low. Thus, the magnetic field produced in the magnetic gauge results almost entirely from the current in the coil 28. This causes the magnetic gauge indicating means to indicate a full fuel tank condition. As the resistance 36 increases, more and more current flows through the serially connected coils 30 and 32. The magnetic field developed by the coil 30 opposes the field of the coil 28, and the magnetic field developed by the coil 32 increases in magnitude with the field direction indicated. The deflection torque or force acting on the magnetic gauge indicating means is determined by the vector resultant of the interacting magnetic fields produced by the coils 28, 30 and 32. As the value of the variable resistance 36 changes from a low resistance, the voltage at the point 38 increases from a low level to a high level. Thus, the variable resistance 36 is a liquid-level sensing device which provides a voltage which varies between upper and lower voltage limits as a function of the liquid level in the fuel tank of the motor vehicle.

The critical liquid-level warning circuit 11 includes a warning circuit proper for controlling the actuation of a warning device, a prove-out circuit for establishing the operability of the warning device and a gate or holding circuit used for a purpose hereinafter described.

The warning circuit proper is supplied with the sensing device voltage, which occurs at the point 38 in the circuit 10, and includes an operational amplifier (comparator) $Q_1$ having an inverting input 40 and a non-inverting input 42. A filter capacitor $C_1$ is connected across the inverting and non-inverting amplifier inputs. The non-inverting input 42 is connected through a resistor $R_1$ to the point 38 in the circuit 10 at which the sensing-device voltage occurs. The inverting input 40 of the amplifier $Q_1$ is connected through a resistor $R_2$ to the arm 44 of a calibration potentiometer 46. The potentiometer 46 has one of its fixed terminals connected to ground and has its other fixed terminal connected through a resistor $R_4$ to a voltage supply line 48. The supply line 48 is connected through the ignition switch 14 to the positive terminal of the DC source of electrical energy 12.

Preferably, the operational amplifier $Q_1$ is an inexpensive type 741 and obtains its positive voltage supply from a feed resistor $R_5$ connected to the voltage supply line 48. The negative voltage supply connection 50 to the amplifier $Q_1$ is connected to the ground lead 26. The output 52 of the amplifier $Q_1$ is connected to the anode of a diode D the cathode of which is connected through a current-limiting resistor $R_6$ to the base or control electrode 54 of a NPN transistor $Q_2$. The emitter of the transistor $Q_2$ is connected through a resistor $R_7$ to the ground lead 26. The collector of the transistor $Q_2$ is connected through an electrically actuable warning device, preferably a warning light 56, to the voltage supply line 48. The warning light 56 may have as much as two candlepower.

In the operation of the above-described portion of the critical liquid-level warning circuit 11, the arm 44 of the potentiometer 46 is set at a predetermined critical reference voltage corresponding to a critical liquid-level in the vehicle fuel tank. When the liquid level in the vehicle fuel tank is high, the variable resistance 36 is low and the sensing device voltage at the point 38 is below the reference voltage established at the inverting input 40 to the amplifier $Q_1$, this voltage being obtained from the potentiometer arm 44 through the amplifier input resistor $R_2$. As the liquid level in the fuel tank decreases, the sensing device voltage at the point 38 increases and is applied to the non-inverting input 42 of the amplifier $Q_1$ through its input resistor $R_1$. As long as the voltage at the non-inverting input 42 is below the reference voltage at the inverting input 40, the electrical signal at the amplifier output 52 is a low-voltage value which is applied through the diode D, which eliminates or reduces the amplifier $Q_1$ offset voltage, to the base or control electrode 54 of the transistor $Q_2$. When the voltage at the non-inverting input 42 to the amplifier $Q_1$ exceeds the critical reference voltage at the inverting input 40, by a few millivolts, the output of the amplifier $Q_1$, which has a high gain, quickly rises to near the amplifier supply voltage. This forward-biases the base-emitter junction of the transistor $Q_2$ rendering it conductive in its output circuit, comprising its collector and emitter, and current flows through the warning lamp 56 to provide a warning light indication to the vehicle driver informing him that the fuel level has decreased to the critical level established by the setting of the potentiometer 46.

It should be noted that the operational amplifier $Q_1$ has a very high input impedance and thus does not load the indicating circuit 10. Moreover, the operational amplifier, with its high gain and when connected in a circuit having the values shown in the drawing, is capable of providing a warning-light "on"-to-warning-light-"off" resolution of 0.1 ohm variation of the variable resistance 36. Moreover, the circuit has a supply-voltage range for the above resolution of from 10 to 20 volts DC.

A desirable feature for a critical liquid-level warning circuit is circuitry for providing warning-device prove-out to indicate to the driver of the vehicle that the warning device is operable. For this purpose, the circuit 11 has a prove-out circuit which includes a PNP transistor $Q_3$ having its base or control electrode 58 connected to the junction 60 formed between a resistor $R_8$ connected in series with a capacitor $C_2$. The series combination of the resistor $R_8$ and capacitor $C_2$ is connected between the voltage supply line 48 and ground as shown in the drawing. The emitter of the transistor $Q_3$ is connected through a resistor $R_9$ to the voltage supply lead 48 and its collector is connected through a resistor $R_{10}$ to the base or control electrode 54 of the transistor $Q_2$.

The function of the prove-out ciruit described in the preceding paragraph is to actuate the warning device 56 for a predetermined time subsequent to the closure of the ignition switch 14, which couples the DC source 12 to the indicating circuit 10 and critical liquid-level warning circuit 11. Upon the closure of the ignition switch 14, either of two conditions can prevail: (1) actual existance of critical liquid-level or below in the vehicle fuel tank; and (2) liquid-level in the vehicle fuel tank above the critical liquid-level. In the first case, the warning device 56 is actuated by the output of the amplifier $Q_1$ as an actual warning and as a prove-out for the warning device. In the second case, where the fuel level is above the critical liquid-level, the amplifier $Q_1$ has a low voltage at its output 52 and does not turn on the transistor $Q_2$. However, upon closure of the ignition switch 14, the capacitor $C_2$ is charged through the resistor $R_8$. During this charging, the emitter-base junction of the transistor $Q_3$ is forward-biased and the transistor $Q_3$ is conductive between its emitter and collector. Thus, the current flows through the resistor $R_9$, the emitter and collector of the transistor $Q_3$, and through the resistor $R_{10}$ into the base of the transistor $Q_2$. The base-emitter junction of the transistor $Q_2$ is forward-biased and this transistor is conductive in its output circuit to energize the warning device 56. This continues as long as the transistor $Q_3$ is conductive. The transistor $Q_3$ becomes non-conductive when the capacitor $C_2$ has charged to near the voltage level on the voltage supply lead 48. With the circuit values indicated in the drawing, the capacitor $C_2$ requires approximately three seconds to charge to this level so that a three second warning-device prove-out signal is given to the driver of the vehicle upon closure of the ignition switch 14.

The circuit 11 also includes gate or holding circuit means for preventing a false critical liquid-level warning when the liquid level in the vehicle fuel tank is at or near the critical level and the fuel is sloshing about in the fuel tank. Under such conditions, the switch 18 opens in the manner described in the aforementioned patent application Ser. No. 255,608. When the switch 18 opens, the magnetic gauge in the indicating circuit 10 retains its reading, but the sensing-device voltage at the point 38 decreases to zero or ground potential, its lower voltage limit. Were the switch 18 to be closed and were the liquid level in the fuel tank to be below the critical level, then the opening and closing of the switch 18 would cause, in the absence of circuitry for preventing its occurrence, the output 52 of the amplifier $Q_1$ to alternate between its low-voltage level and its high-voltage level causing repetitive actuation and deactuation of the warning device 56. However, the voltage at the point 22 in the indicating circuit 10 also goes to this voltage limit, which voltage is applied through a lead 62 and a resistor $R_{13}$ to the base of a PNP transistor $Q_6$.

The emitter of the transistor $Q_6$ is connected through a resistor $R_{12}$ to the voltage supply lead 48 and its collector is connected to the base of an NPN transistor $Q_4$. The collector of the transistor $Q_4$ is connected through a resistor $R_{11}$ and a lead 64 to the junction 60 at the base of the transistor $Q_3$. The emitter of the transistor $Q_4$ is connected to the collector of an NPN transistor $Q_5$ the emitter of which is connected to ground. This output circuit of the transistor $Q_5$ is controlled by its base electrode 66 which is connected at 68 to one terminal of a capacitor $C_3$. The other terminal of the capacitor $C_3$ is connected to the ground lead 26. A resistor $R_{14}$ is connected between the emitter of the transistor $Q_2$ and the junction 68 formed between the capacitor $C_3$ and the base of the transistor $Q_5$.

In the operation of the above-described circuitry for preventing false critical liquid-level warnings, let it be assumed that the warning device 56 had not been actuated immediately prior to the opening of the switch 18. If the warning device 56 is not actuated, then the voltage at the non-inverting input 42 to the amplifier $Q_1$ must be below the critical level established at the inverting input 40. When the switch 18 opens, the voltage at the point 38 in the magnetic gauge circuit becomes equal to ground potential further reducing the voltage at the non-inverting input 42 to the amplifier $Q_1$ below the cricital voltage level such that the transistor $Q_2$ cannot be rendered conductive to actuate the warning device 56.

If, however, prior to the opening of the switch 18, the voltage at the point 38 is above the critical level established by the potentiometer arm 44, then the warning device 56 is actuated due to the conduction of the transistor $Q_2$. When the transistor $Q_2$ conducts, current flows through the resistor $R_7$ to establish a potential drop across it, and current also flows through the RC circuit comprising the resistor $R_{14}$ and the capacitor $C_3$. The capacitor $C_3$ charges to a potential determined by the potential difference across the resistor $R_7$. When the switch 18 opens, the voltage across the sensing device 36 and the voltage at the point 22 in the magnetic gauge circuit 10 both go to ground potential and this potential is applied via the lead 62 to the base of the transistor $Q_6$ to render it conductive and also to render the transistor $Q_4$ conductive as described above. The voltage at the point 68 at the upper terminal of the capacitor $C_3$ is applied to the base of the transistor $Q_5$ Thus, when the warning device 56 has been energized just prior to the opening of the switch 18, the transistor $Q_5$ is conductive in its output circuit at the same time that the transistor $Q_4$ is conductive in its output circuit. Because the collector of the transistor $Q_4$ is connected through the resistor $R_{11}$ to the junction 60 at the base of the transistor $Q_3$, a current path is provided from the junction 60 through the output circuits of the transistors $Q_4$ and $Q_5$ to ground. This applies a forward-bias to the emitter-base junction of the transistor $Q_3$ and provides a current path through this junction so that the transistor $Q_3$ is rendered conductive between its emitter and collector. Current then flows through the emitter-collector circuit of the transistor $Q_3$ into the base of the transistor $Q_2$ and across its base-emitter junction and through the resistor $R_7$ to ground. The transistor $Q_2$ then is conductive, and the warning device 56 remains actuated even though the switch 18 has opened. This continued actuation of the warning device 56 results from the conduction of the transistor $Q_5$ and continues so long as its base-emitter junction is forward-biased.

Resistors $R_1$, $R_2$, $R_5$, $R_6$, $R_7$, $R_9$, $R_{10}$, $R_{11}$, $R_{12}$ and $R_{13}$ provide transient voltage protection.

The component values and types shown in the drawing are given by way of example and not limitation.

What is claimed is:

1. A critical liquid-level warning circuit for association with a liquid-level indicating circuit coupled to a DC source of electrical energy through a switch, said indicating circuit including a sensing device which provides a voltage which varies between upper and lower voltage limits as a function of a liquid level sensed by said sensing device, said critical liquid-level warning circuit comprising:

an operational amplifier having inverting and non-inverting inputs and having an output, said sensing device being coupled to one of said amplifier inputs to supply said sensing device voltage thereto;

means for providing a critical reference voltage to the other of said inputs to said operational amplifier;

an electrically actuable warning device;

a first transistor having a control electrode and having an output circuit, said first transistor output circuit being connected in series with said warning device and said first transistor control electrode being connected to the output of said operational amplifier;

a capacitor coupled to said output circuit of said first transistor, said capacitor being connected to accumulate a potential difference across it when said first transistor is in a conductive state corresponding to actuation of said warning device;

a second transistor having a control electrode and an output circuit, said second transistor output circuit being coupled to said control electrode of said first transistor; and a resistor and a capacitor connected in series, said series-connected resistor and capacitor being connected across said source of electrical energy when said switch is in a closed condition and the junction formed between said resistor and said capacitor being coupled to said control electrode of said second transistor.

2. A critical liquid-level warning circuit in accordance with claim 1 wherein said indicating circuit further includes a second switch coupled to said sensing device, said second switch having a condition wherein said sensing device voltage reaches one of said voltage limits, and wherein said warning circuit further includes a second capacitor coupled to the output of said first transistor, said second capacitor accumulating a potential difference across it when said first transistor is conductive and said warning device is actuated, and solid-state switching means coupled to said second capacitor, coupled to said indicating circuit at a location between said sensing device and said second switch and coupled to said junction formed between said series-connected resistor and first-mentioned capacitor, for maintaining said first transistor output circuit in a conductive state when said second switch is in said condition wherein said sensing device voltage reaches one of said voltage limits.

3. A critical liquid-level warning circuit for association with a liquid-level indicating circuit coupled to a DC source of electrical energy through a switch, said indicating circuit including a sensing device which provides a voltage which varies between upper and lower voltage limits as a function of a liquid-level sensed by said sensing device and a second switch coupled to said sensing device, said second switch having a condition wherein said sensing device voltage reaches one of said voltage limits, said critical liquid-level warning circuit comprising:

first circuit means, supplied with said sensing device voltage, for generating an electrical signal having one of two conditions depending upon whether said sensing device voltage is above or below a predetermined critical level;

an electrically actuable warning device;

second circuit means for actuating said warning device when said first circuit means electrical signal is in one of said two conditions and for preventing actuation of said warning device when said first circuit means electrical signal is in the other of said two conditions, said second circuit means being coupled to said first circuit means;

third circuit means, coupled to said second circuit means, for actuating said warning device for a predetermined time subsequent to the closure of said switch coupling said DC source of electrical energy to said indicating circuit; and fourth circuit means for causing said warning device to retain the state of warning attained by it immediately prior to said second switch being placed in said condition wherein said sensing device voltage reaches said one of said voltage limits.

4. A critical liquid-level warning circuit for association with a gauge circuit for a motor vehicle, said motor vehicle having a DC source of electrical energy and an ignition switch, said gauge circuit including a sensing device which provides a voltage which varies between upper and lower voltage limits as a function of the level of a liquid located within said motor vehicle, said liquid level being sensed by said sensing device, said critical liquid-level warning circuit comprising:

a first circuit comprising an operational amplifier having a non-inverting input, an inverting input, and an output, said operational amplifier having one of its inputs coupled to said sensing device to receive said sensing device voltage;

a voltage supply lead connected through said ignition switch to one terminal of said source of electrical energy;

a potentiometer connected between said voltage supply lead and the other terminal of said source of electrical energy, said potentiometer having an arm establishing a critical voltage level, said potentiometer arm being connected to the other of said inputs to said operational amplifier;

a solid-state switching device having an output circuit and a control electrode, said control electrode being connected to the output of said operational amplifier;

a warning device connected in series with said output circuit of said solid-state switching device, said series-connected warning device and solid-state switching device output circuit being connected between said voltage supply lead and said other terminal of said source of electrical energy; and a warning device prove-out circuit, said prove-out circuit including a second solid-state switching device having an output circuit and a control electrode, said second solid-state switching device output circuit being coupled between said voltage supply lead and said control electrode of said first-mentioned solid-state switching device, a resistor having one of its leads coupled to said voltage supply lead, a capacitor having one of its leads coupled to the other lead of said resistor to form a junction between said capacitor and said resistor, said capacitor having its other lead connected to said other terminal of said source of electrical energy, and said second solid-state switching device having its control electrode connected to the junction formed between said resistor and said capacitor.

5. A critical liquid-level warning circuit in accordance with claim 4 wherein said motor vehicle gauge circuit further includes a second switch coupled to said sensing device, said second switch having a condition wherein said sensing device voltage reaches one of said voltage limits, and wherein said warning circuit further includes a circuit comprising a third solid-state switching device having an output circuit coupled to said junction formed between said resistor and said capacitor and having a control electrode, a fourth solid-state switching device having an output circuit coupled between said voltage supply lead and said control electrode of said third solid-state switching device, said fourth solid-state switching device having a control electrode coupled to said gauge circuit at a point between said sensing device and said second switch, a fifth solid-state switching device having an output circuit connected in series with the output circuit of said third solid-state switching device and having a control electrode, and a capacitor for accumulating a potential difference across it when said warning device is actuated, said capacitor being coupled to said output circuit of said first-mentioned transistor and to said control electrode of said fifth solid-state switching device, said fifth solid-state switching device controlling the actuation of said warning device when said second switch is in its condition wherein said sensing device voltage reaches one of said voltage limits.

* * * * *